Dec. 28, 1937.  J. WEIMONT ET AL  2,103,654
MACHINE FOR ATTACHING PRICE TAGS
Filed May 21, 1936  10 Sheets-Sheet 7
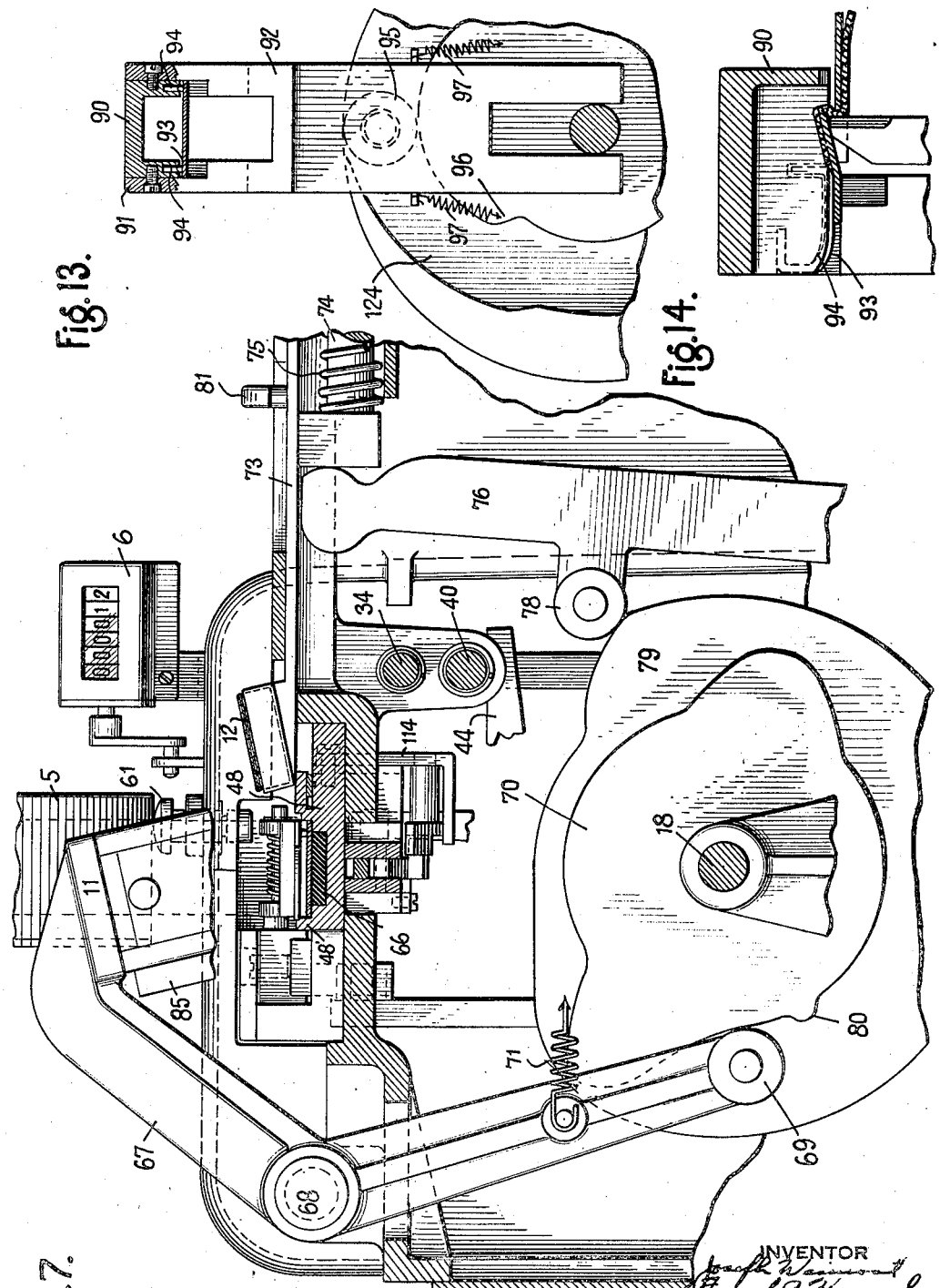
INVENTOR
ATTORNEY

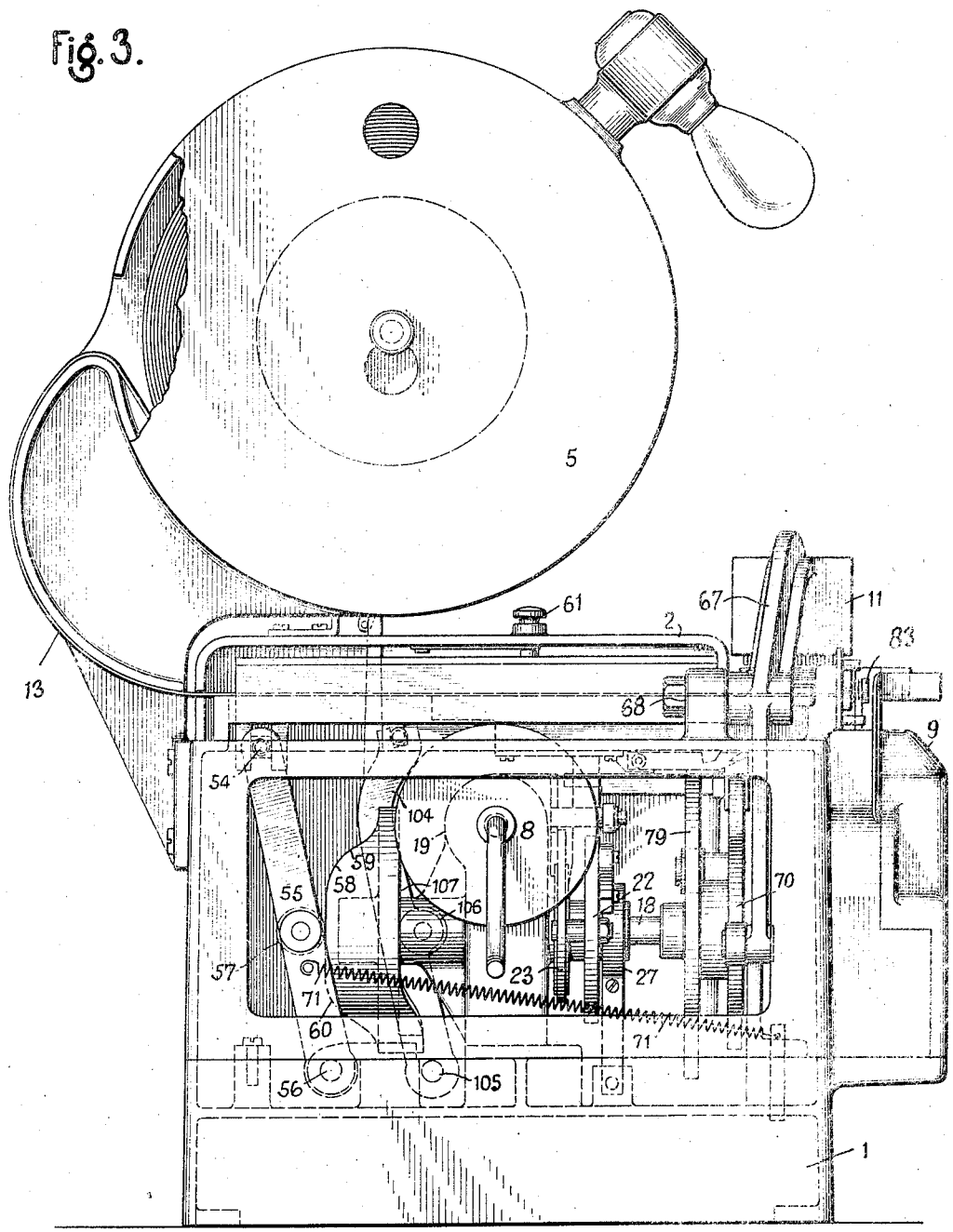

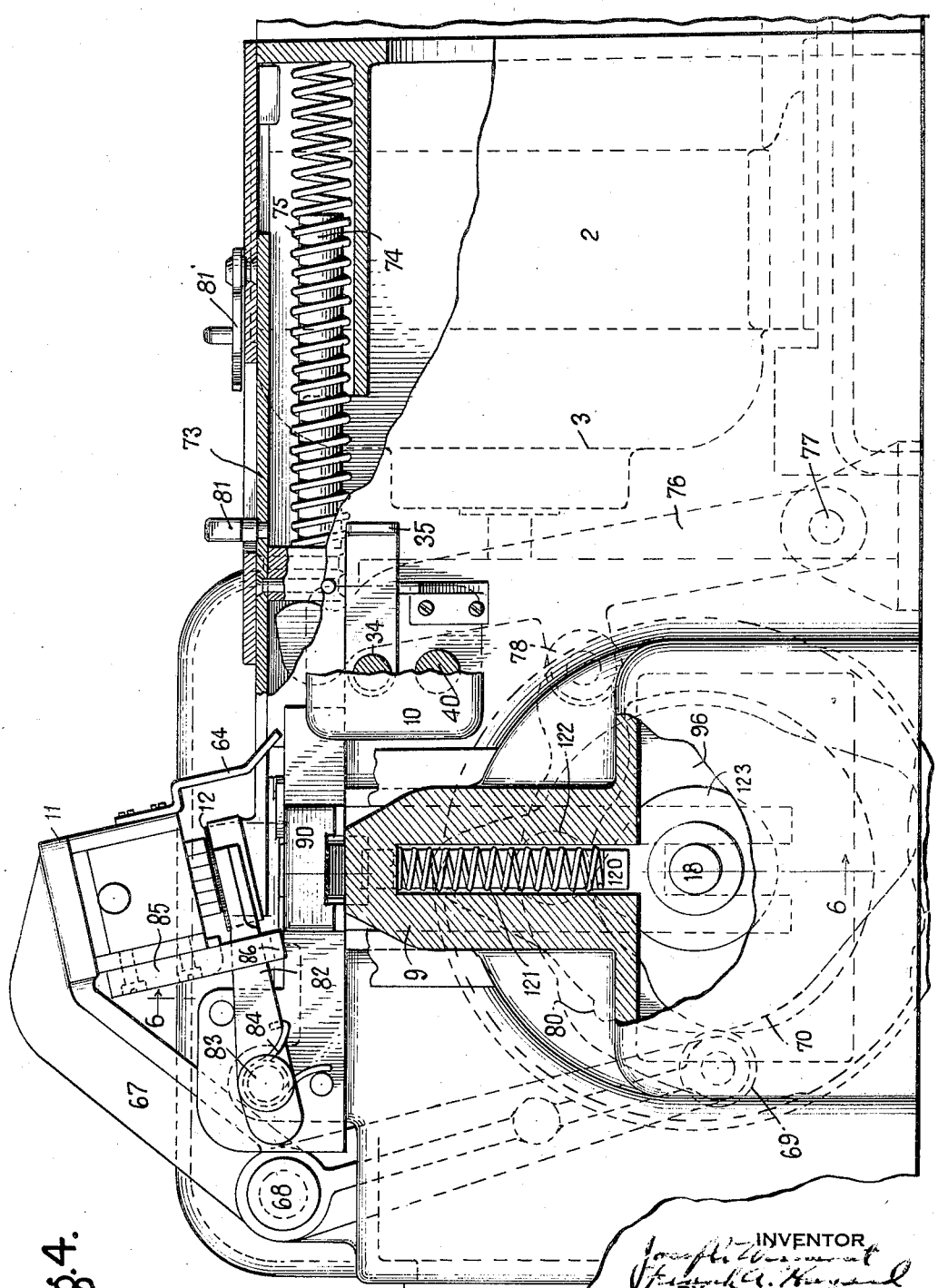

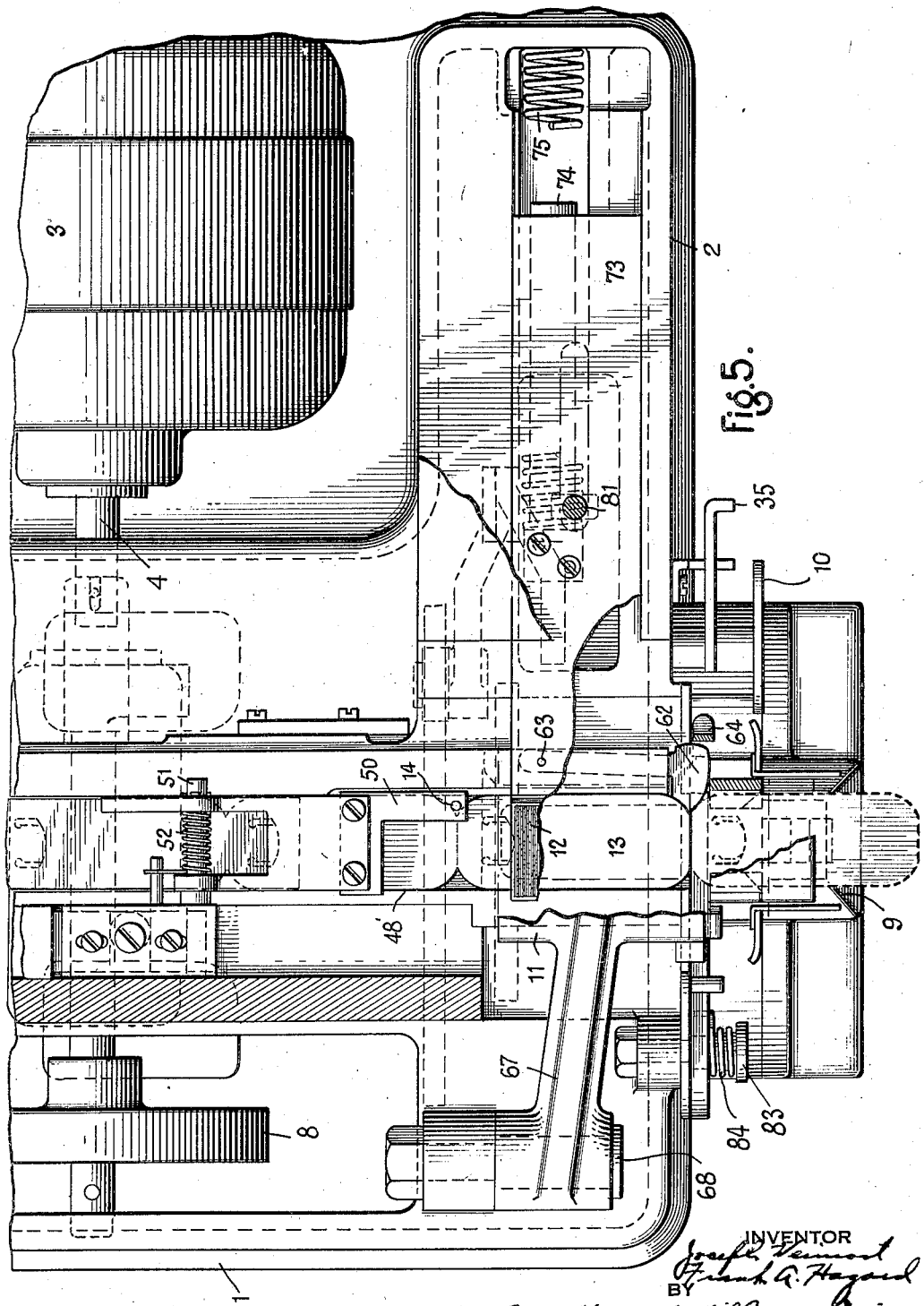

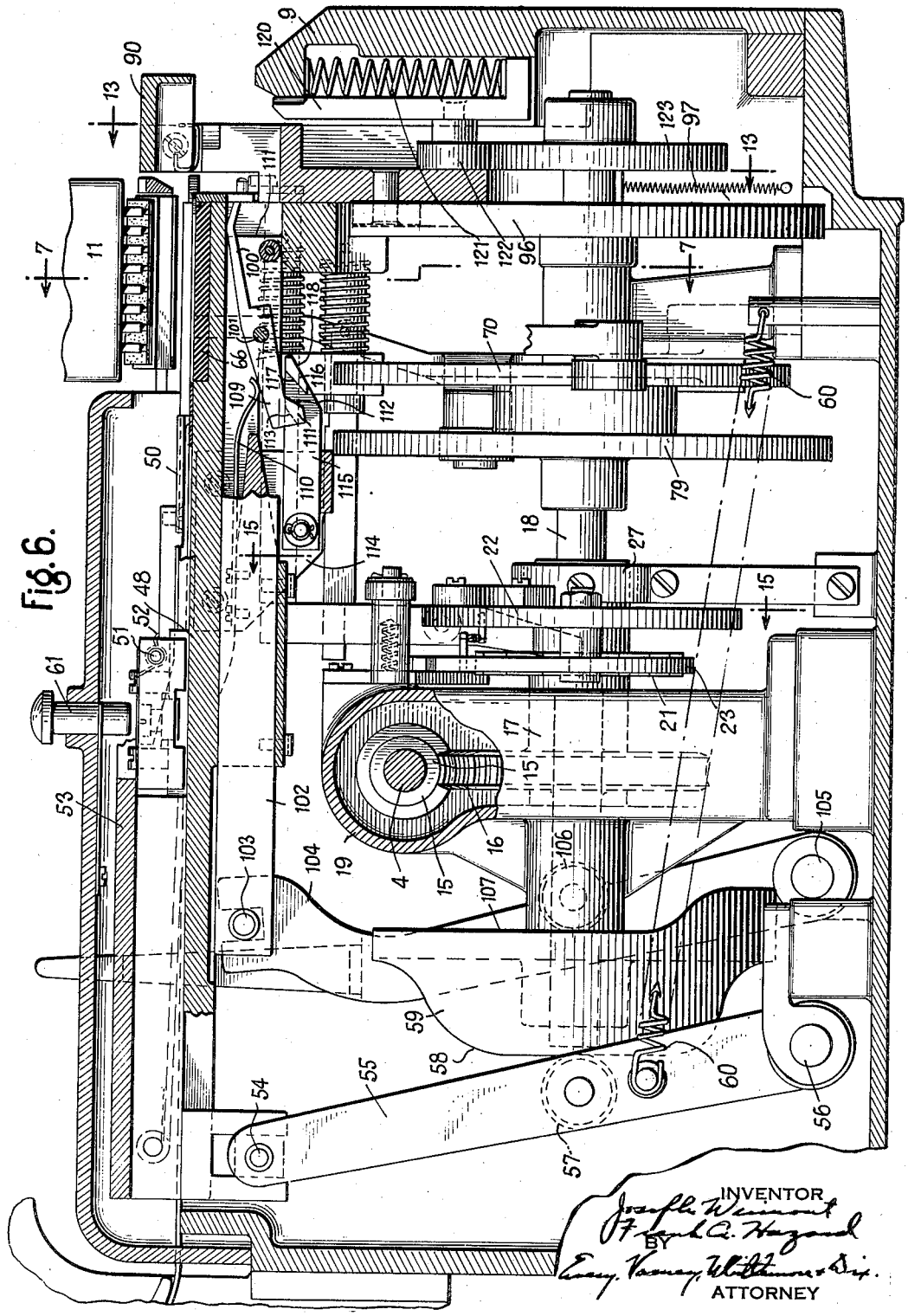

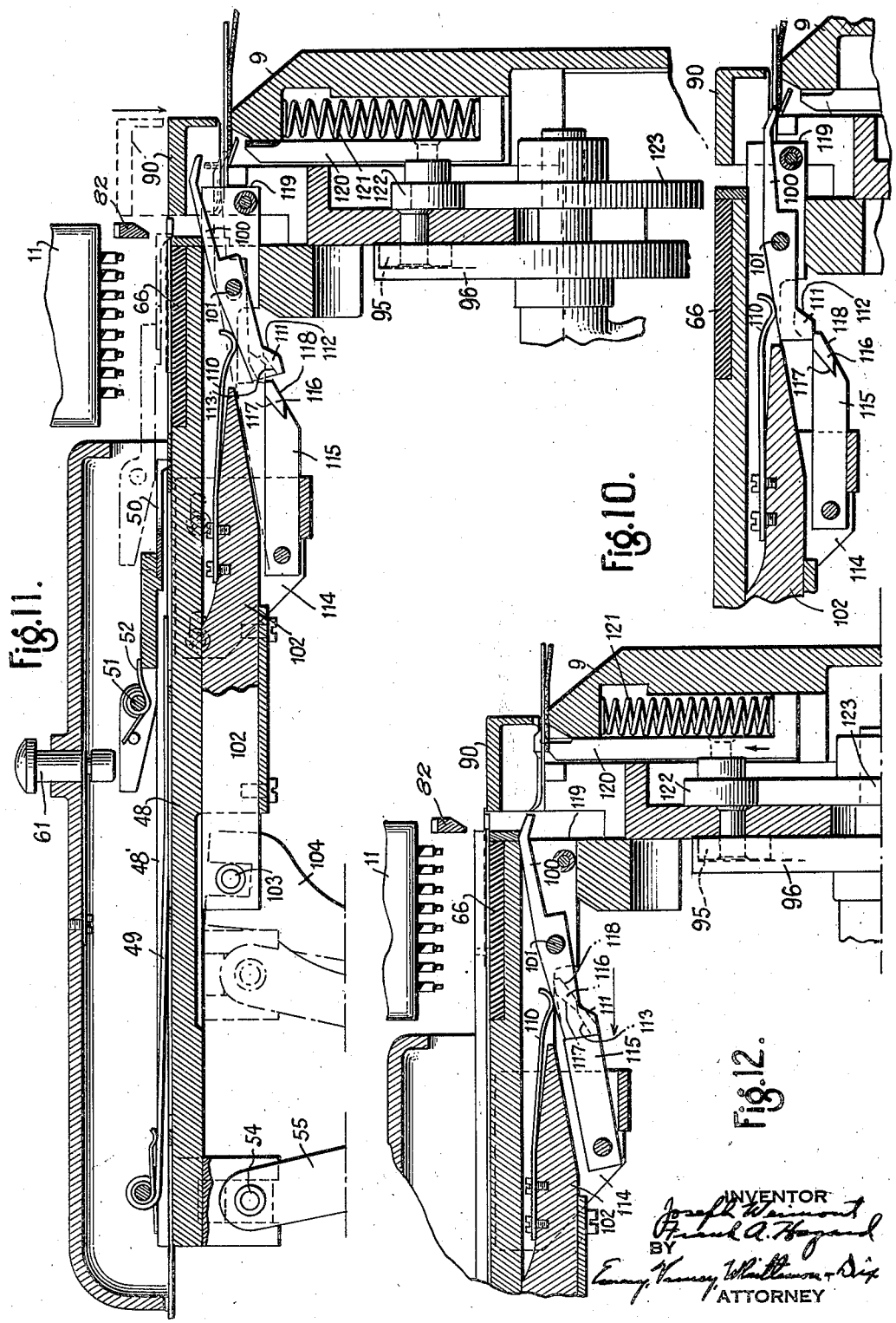

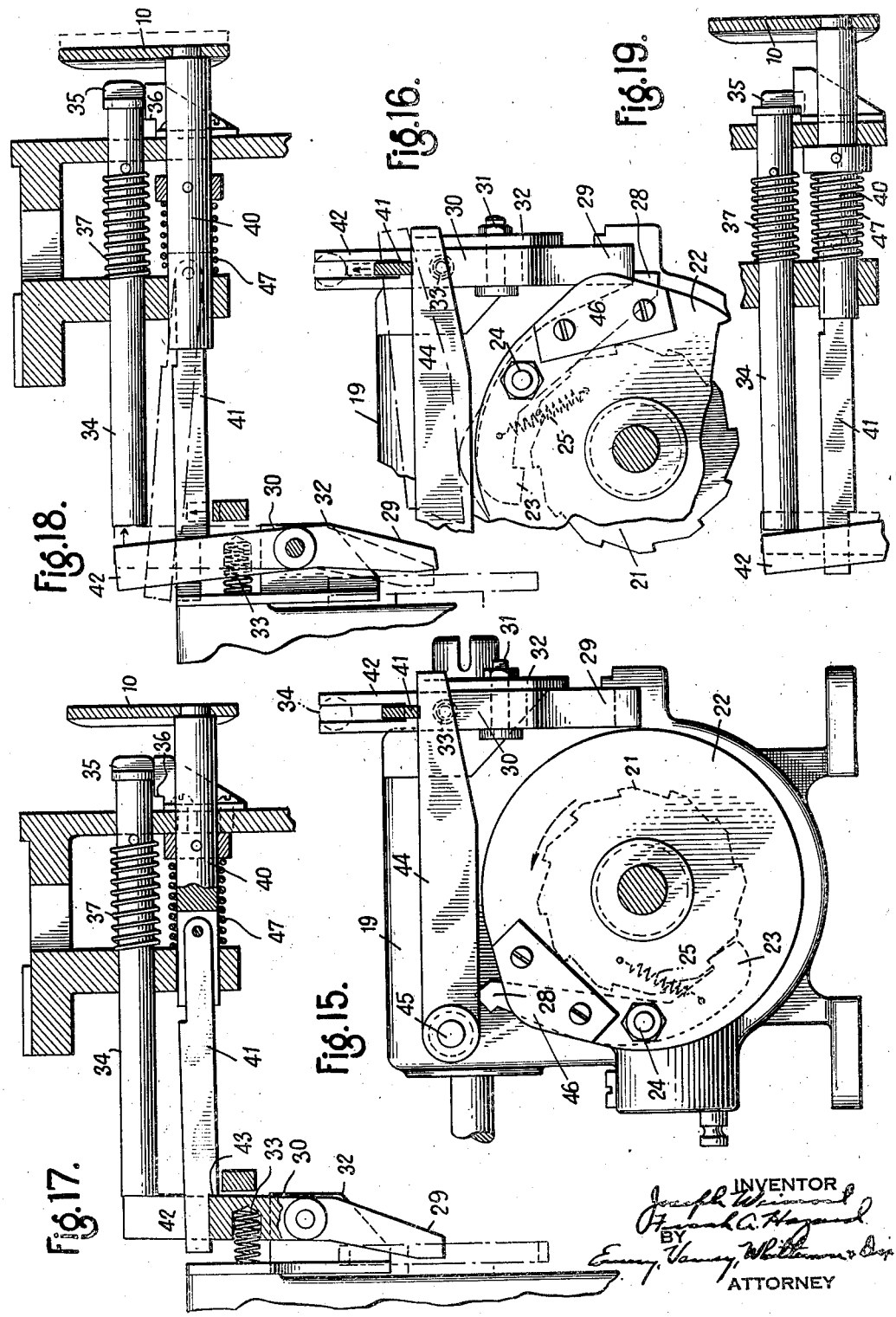

Patented Dec. 28, 1937

2,103,654

UNITED STATES PATENT OFFICE 2,103,654

MACHINE FOR ATTACHING PRICE TAGS

Joseph Weimont, Bogota, and Frank A. Hazard, Elizabeth, N. J., assignors to A. Kimball Company, New York, N. Y., a corporation of New York Application May 21, 1936, Serial No. 80,928

13 Claims. (Cl. 93—88)

This invention relates to machines for attaching price tags to articles of merchandise.

A type of price tag which is being used increasingly to mark delicate fabrics, such as silk hosiery, for example, is one in which a tab is formed in the body of the tag. Such tags are attached to the merchandise by inserting the merchandise between the tab and the body of the tag and then pushing the tab through the plane of the tag so that it becomes interlocked with the merchandise. One price tag of this type is disclosed in Laencher Patent No. 1,854,149 dated April 12, 1932. It is an object of the invention to provide a machine for attaching such tags and other tags of this general nature to merchandise.

It is a further object of the invention to provide a machine which will feed such tags in strip form, print the desired price indicia thereon, sever an individual tag from the strip and attach the severed tag to the merchandise.

Other objects and advantages of the invention will appear hereinafter.

A preferred embodiment of the invention is shown in the accompanying drawings, in which, Figure 1 is a perspective view of the machine.

Figure 3 is a side elevation with parts of the casing removed.

Figure 4 is a front elevation partly in section.

Figure 5 is a top plan view partly in section.

Figure 6 is a section on the line 6—6 of Figure 4.

Figure 7 is a section on the line 7—7 of Figure 6.

Figures 10, 11, and 12 are sectional views showing successive stages of movement of the tab opening mechanism.

Figure 13 is a section on the line 13—13 of Figure 6.

Figure 14 is a detail view showing the tab closing operation.

Figure 15 is a section on the line 15—15 of Figure 6.

Figure 16 is a similar view with the parts in a different position.

Figures 17, 18, and 19 are sectional views illustrating the starting mechanism.

Figure 1:
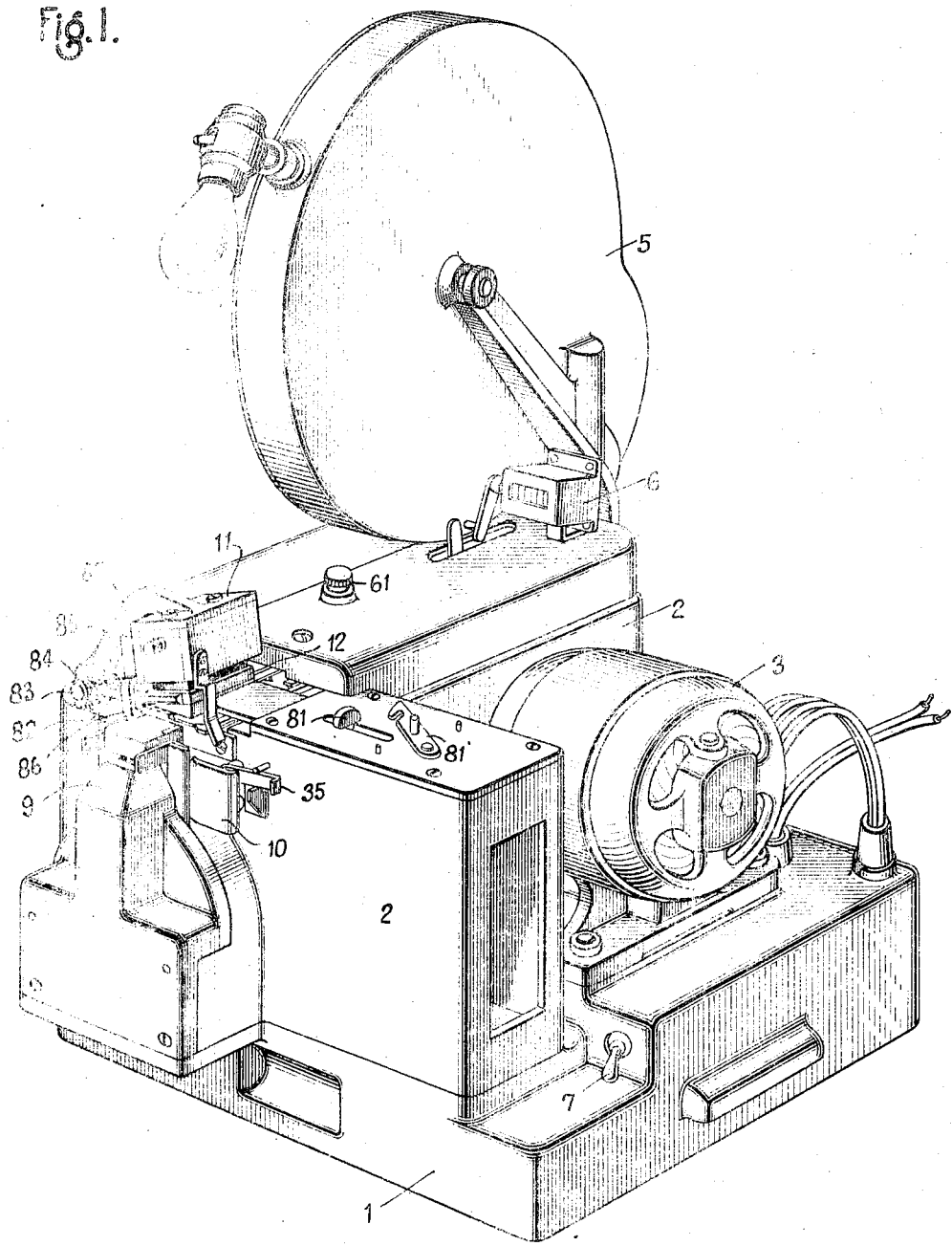
Figure 2:
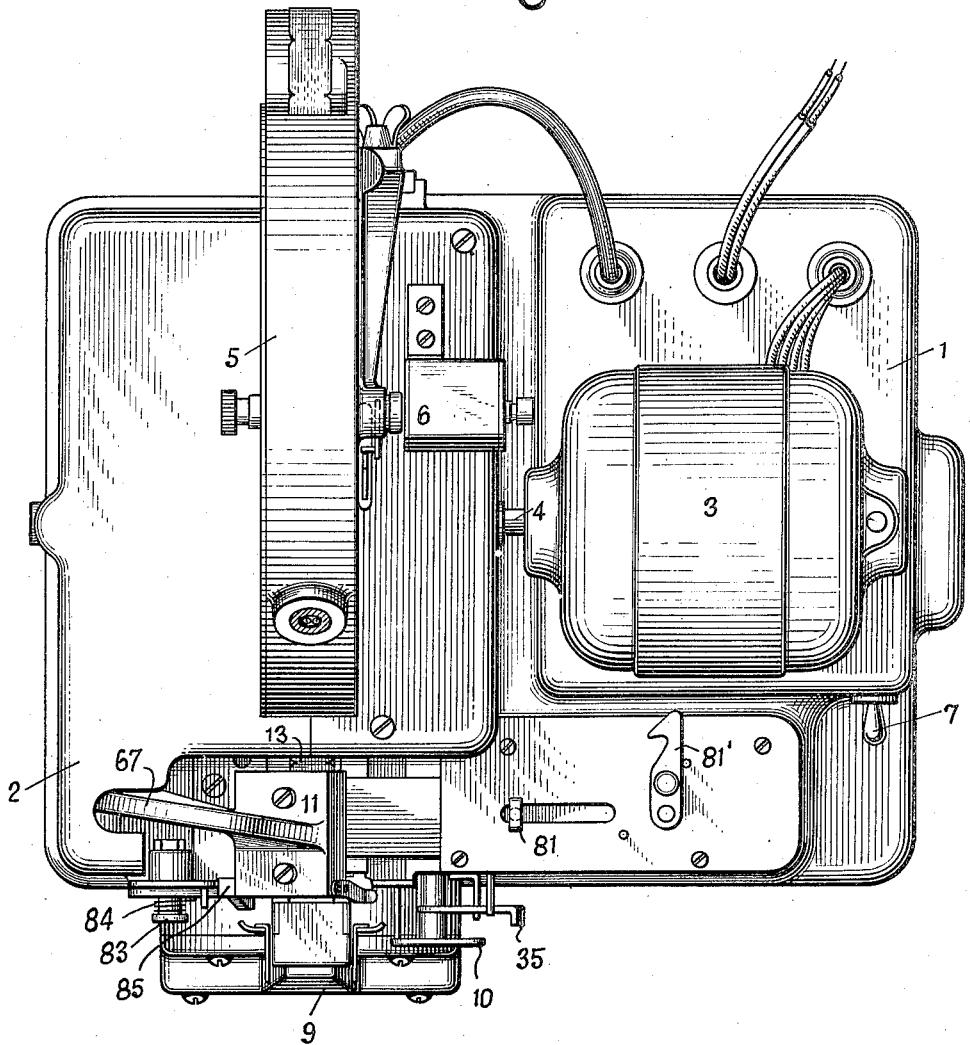
Figure 2 is a top plan view.

Referring to the drawings, and particularly to Figures 1 and 2, the machine comprises a base 1 on which is mounted an L-shaped housing 2 which surrounds and encloses most of the working parts of the machine. Certain exterior features of the machine may be referred to before proceeding to a detailed description. These include a motor 3, mounted on the base 1 and having a shaft 4 which projects through the wall of the housing 2; a tag strip housing 5 mounted on the rear of the housing 2; a tag counter 6 mounted on top of the housing 2; and a switch 7 for controlling the motor 3. Other exterior features include an anvil 9 on which the merchandise to be tagged is placed; a clutch operating member 10, printer head 11; and ink pad 12.

It will be understood that the ticket strip 13 is led from the housing 5, across the machine in guides provided for the purpose, to the printing position beneath the printer head 12. When it is desired to attach a price tage to an article of merchandise, an edge of the article is placed over the anvil 9, the clutch operating member 10 is pressed, and during the succeeding cycle of operations, about to be described, a tag is printed, fed forward, severed and attached to the merchandise.

Referring to Figures 6 and 15 to 19, motor shaft 4 carries a worm gear 15 which meshes with gear 16 carried on a sleeve 17 which surrounds the main operating shaft 18. The motor shaft 4 also preferably carries a fly wheel 8 which supplies a certain amount of inertia. The gears 15 and 16 are located within a housing 19, but the sleeve 17 projects through one wall of the housing and carries at one end a ratchet 21. Fixed to the shaft 18 closely adjacent the ratchet 21 is a disk 22 having a pawl 23 pivoted thereon at 24, a spring 25 being secured to the pawl 23 and the disk 22 in such manner as to normally hold the pawl in engagement with the ratchet 21. It will be understood that the gears 15 and 16, sleeve 17 and ratchet 21 are driven continuously by motor 3 so long as current is supplied thereto. Whenever the pawl 23 is permitted to engage the ratchet 21, the shaft 18 will be rotated thereby, but upon subsequent disengagement of the pawl 23, the shaft 18 will cease to rotate. In order to stop the shaft 18 and its connected parts immediately that the pawl 23 is disengaged from the ratchet, a friction brake 27 of any suitable construction is provided.

Normally the pawl 23 is disengaged from the ratchet 21, at the end of any operating cycle, by engagement of the arm 28 of the pawl 23 against the lower end 29 of lever 30 which is pivoted at 31 to a bracket 32 secured to the housing 19. In order to release the pawl 23 to permit another operating cycle, the lever 30 must be rocked, as illustrated in Figure 18, from the position shown in dotted lines, where it is in the path of the pawl to the position shown in full lines, a spring 33 being provided, however, to normally hold the lever in the dotted line position of Figure 18, i. e. in position to disengage the pawl upon completion of the cycle.

In case it is desired to operate the machine continuously, that is, to permit one cycle after another without interruption, the lever 30 may be rocked by the plunger 34 which extends through the housing 2 and terminates in the latch 35 which may be locked behind the shoulder 36 so as to hold the plunger forward against the tension of the spring 37 which normally retracts it. As long as the plunger is locked forward, the pawl 23 remains in engagement with the ratchet 21 and the machine continues to operate.

It is usually more desirable, however, to operate the machine intermittently, a single cycle at a time, in view of the fact that between operating cycles it is necessary that the operator remove the tagged merchandise from the anvil, lay it aside, and pick up another piece of merchandise and place it over the anvil.

For such intermittent operation, the clutch operating member 10 is used to rock lever 30, and means are provided for bringing the operating mechanism to a stop at the end of said cycle irrespective of the release of the clutch operating member. For this purpose a second plunger 40 is provided which extends through the housing 2 and terminates in the clutch operating member 10 previously referred to. The said plunger has pivoted thereto an arm 41 which extends between the bifurcated ends 42 of the lever 30, the said arm having a shoulder 43 which engages the lever 30 so that the lever 30 will be rocked when the member 10 is pushed forwardly. Mounted beneath the arm 41 is a lever 44 pivoted at 45 to the housing 19, the said lever being mounted in position to be engaged by the cam 46 mounted on the disk 22. Thus when the member 10 is pushed forward against the tension of the spring 47, the lever 30 is moved to release the pawl 23 to initiate an operating cycle. During the early part of the cycle, however, the cam 46 engages the lever 44, which in turn engages and lifts the arm 44 to disengage the shoulder 43 from the lever 30. The lever 30 thereupon returns to its normal position under the influence of spring 33 and releases the pawl 23 and stops the machine at the end of the cycle even though the member 10 has not been released by the operator. In order to cause another operating cycle to take place, the operating member 10 must be released and pushed forward again.

*Feed mechanism*

Extending across the upper part of the machine is a bar 48 which is grooved to provide guides 48' for the tag strip. If desired, a spring pressed tongue 49 may be provided to frictionally engage the tag strip to hold it in the groove.

The strip feed mechanism feeds the strip of tags step by step, one tag length at a time, and comprises a pawl 50 pivoted on shaft 51 and held in engagement with the tag strip by torsion spring 52. The said shaft 51 is adjustably mounted on the slide 53 which is operatively connected at 54 with lever 55 pivoted at 56. The said lever 55 carries a roller 57 which engages the face 58 of cam 59, being yieldingly held thereagainst by the spring 60. The cam face 58 is formed to cause one complete feed stroke of the pawl 50 during each operating cycle and is timed to cause a feed stroke immediately after the tag is printed. If desired, a plunger 61 may be mounted in the housing in position to engage the rear end of the pawl 50. This plunger may be depressed by the operator to lift the pawl from the tag strip to permit withdrawal of the strip when desired.

The pawl 50 may engage any suitable portion of the tag strip for feed purposes, but in the preferred embodiment illustrated, the said pawl engages the rounded shoulders 14 of the individual tags. If desired, in order to secure accurate registration of the tag strip in order to insure accurate severing and printing of the individual tags, a pawl 62 may be provided. Said pawl is pivoted at 63 and is adapted to be moved toward the notches in the edge of the tag strip by the cam finger 64 secured to the printing head. On each down stroke of the printing head the pawl 62 is moved toward the strip and corrects any error in the position thereof. As will be explained hereinafter, the printer head makes two down strokes in each operating cycle, one to print the tag, and one to sever the printed tag after it has been fed forward, and consequently operation of the pawl 62 by the printing head corrects the position of the tag strip at the two critical moments, i. e. just before a tag is printed, and just before it is severed.

*Printing mechanism*

Figure 8:
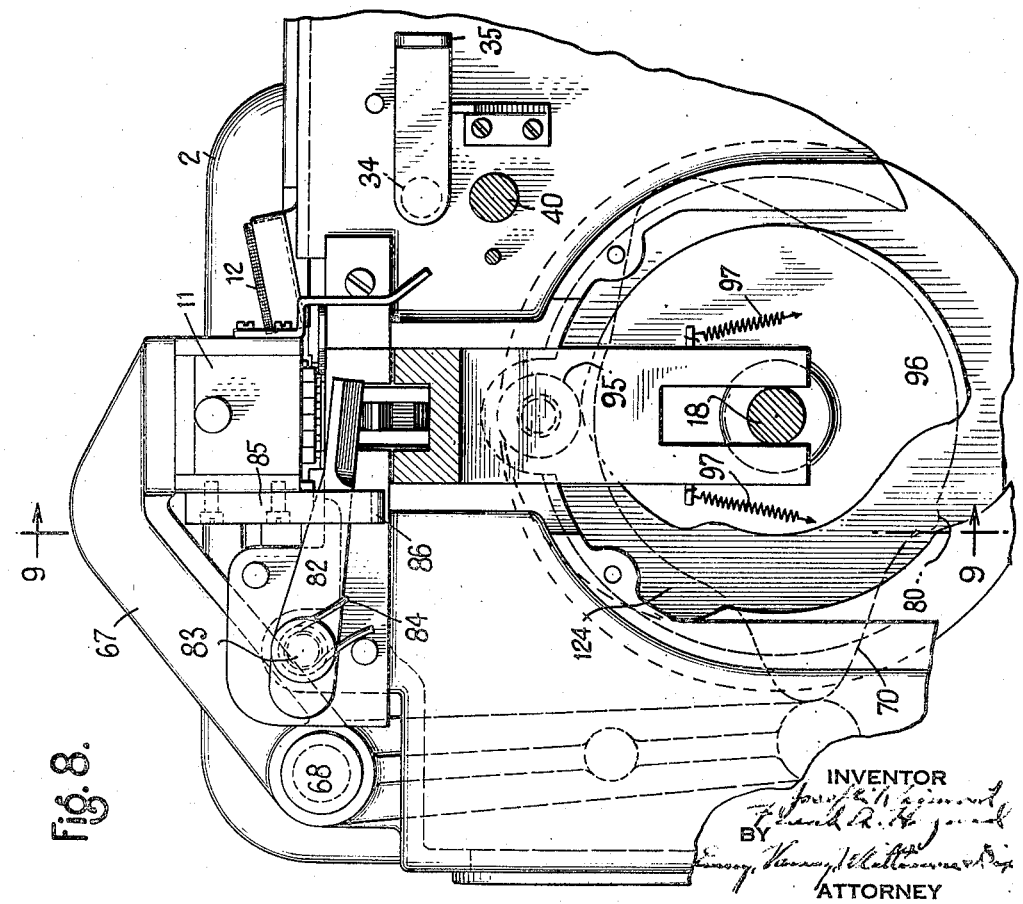
Figure 8 is a front elevation partly in section.

A rubber platen 66 is mounted in the bar 48 in the path of the tags immediately adjacent the edge where the tags are severed. Cooperating with the said platen is the printer head 11 mounted on a bell crank 67 pivoted at 68, which said bell crank is provided with a roller 69 which rides against the cam 70 secured to the shaft 18. The roller 69 is held against the cam by a spring 71. The cam 70, as illustrated in Figures 7 and 8, is so formed as to cause the printer head to be depressed twice during each operating cycle, once all the way to the platen for printing purposes, and once part way toward the platen for severing purposes as hereinafter explained.

The ink pad 12 is carried on a slide 73 to which is secured a rod 74 surrounded by the spring 75 which urges the slide and ink pad toward inking position. The slide is controlled, however, by the arm 76, pivoted at 77, carrying a roller 78 which engages the cam 79. As will be observed from Figures 4 and 7, the cam 79 is so shaped as to permit the slide 73 to advance the ink pad to inking position during the interval between the severing stroke of the printing head and the printing stroke. If desired, the cam 79 may be provided with a small hump 80 which depresses the printing head slightly while the ink pad is in advanced position in order to insure proper inking of the type. If desired, the ink pad slide 23 may be provided with a stud 81 which projects through the top of the housing in position to be engaged by latch 81' which holds the slide in retracted position so that ink may be conveniently applied thereto.

It has been found convenient to utilize the motion of the printing head to operate the cutting knife 82 which severs the printed tags from the strip. The said knife is pivoted on the stud 83 and is urged upwardly by the torsion spring 84. As will be apparent from Figures 11 and 12, the knife lies in the path of movement of the printer head and is moved downwardly in a cutting stroke whenever the printer head is depressed. If desired, an arm 85 may be attached to the printer head, and may be provided with a finger 86 which extends under the knife to lift the knife in case it should become jammed and should fail to lift under the influence of its torsion spring 84.

Attaching mechanism

In the preferred embodiment of the machine, the attaching mechanism comprises three co-operating elements, (1) a device for receiving the printed severed tag as it is fed from printing position and moving the same to attaching position, (2) a device for opening the tab of the ticket, and (3) a device for pushing the tab through the plane of the ticket and causing the same to be interlocked with the merchandise.

Figure 9:
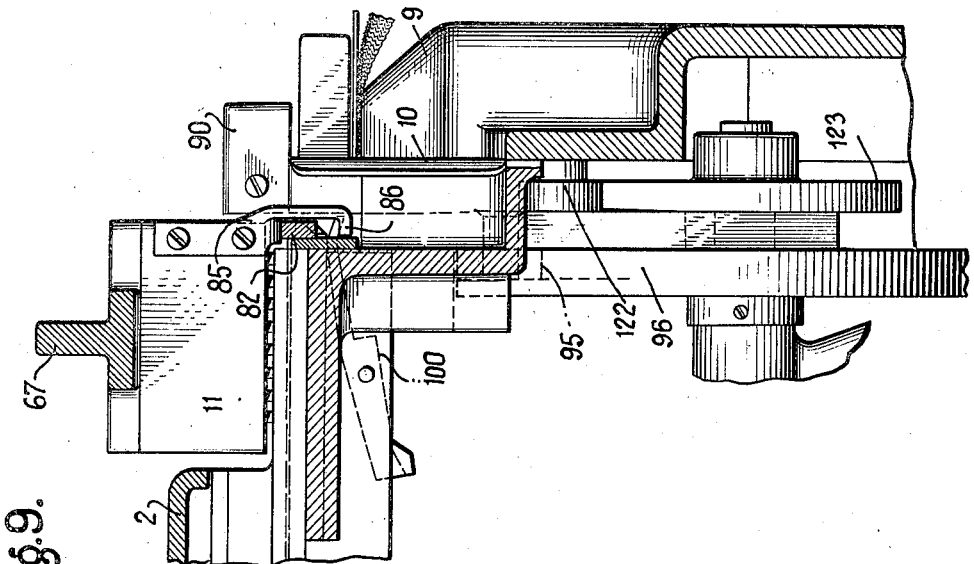
Figure 9 is a section on the line 9—9 of Figure 8.

The device for receiving the printed severed tag comprises the head 90 which is secured between the bifurcated ends 91 of the slide 92. Slots 93 are provided between the head 90 and the adjacent portions of the slide 92, and springs 94 of resilient wire are mounted in the slots to grip the edges of the ticket as illustrated in Figure 13. The slide 92 carries a roller 95 which rides on cam 96 which is secured to the shaft 18, the said roller being held against the cam by springs 97. This cam is shaped to cause the slide 92 and the head 90 to reciprocate between the attaching position illustrated in Figures 9, 11, and 12 and the tag receiving position illustrated in Figures 4 and 6.

At the end of each operating cycle, and at the beginning of the following cycle the head 90 is slightly above the attaching position, in order to permit the tagged merchandise to be easily removed from the anvil, and another piece of merchandise placed thereon. During the printing operation, the head 90 moves slowly upward and reaches tag receiving position shortly before the strip feeding operation begins. In the tag receiving position, the slots 93 are in register with the surface of the platen 66, so that as the ticket is fed forward from printing position it is received in the slots. The head 90 remains in the tag receiving position during the entire strip feeding operation and during the tag severing operation, following which it is lowered to attaching position.

The tab opening device comprises a pawl 100 pivoted at 101 to a slide 102 connected at 103 with the lever 104 which is pivoted at 105. Lever 105 carries a roller 106 which engages the cam face 107 of the cam 59, the cam face being so shaped as to cause the slide 102 to reciprocate once during each operating cycle. The said cam is timed to cause said reciprocation to take place after the feeding operation is completed and after the head 90 has been lowered to attaching position. The finger 100 is provided with a rearwardly extending portion 109 upon which rests a leaf spring 110 which tends to hold the pawl in the position illustrated in Figure 6. Extending laterally from the portion 109 is a lug 111 forming two cam faces 112 and 113. Pivotally mounted on a bracket 114 secured to the bar 48 is an arm 115 having a laterally extending lug 116 having two cam faces 117 and 118; the lugs 111 and 116 being so located that the cam faces engage as the slide 102 moves back and forth. Thus, starting from the position illustrated in Figure 6 in which a tag has been received by the head 90 and is about to be lowered to attaching position, it will be observed that as the slide 102 moves forwardly, the cam face 112 will engage the cam face 117 as illustrated in Figure 10, thus causing the finger 100 to rock in a clockwise direction to engage the tab of the ticket to open the same to receive the edge of the merchandise. While the tab is thus held open by the finger 100, the rear edge of the ticket is engaged by the leading edge 119 of the slide 102 which moves the ticket forward with the tab held open to engage the merchandise which is held on the anvil. At the end of the forward motion of the slide 102, the cam face 112 rides off of the cam face 117 and allows the pawl to lift free of the tag as illustrated in Figure 12. As the slide is retracted as illustrated in Figure 11, the cam face 113 engages the cam face 118 which lifts the arm 115 so that the pawl may be retracted without being again depressed.

Meanwhile the ticket which has been engaged with the merchandise has been moved out of the slots 93 and is held in attaching position by its engagement with the merchandise, although upward movement is still restrained by the head 90. In order to close the tab and thus interlock the same with the merchandise, a plunger 120 is provided which is mounted to slide in a groove in the anvil 9. The said plunger is normally held in retracted position by the spring 121, but is provided with a roller 122 which rides on the cam 123 which is formed to cause the plunger to reciprocate once during each operating cycle. The cam is timed to raise the plunger 120 after the head 90 has been lowered and after the tag has been moved forward by the end 119 of the slide 102 into engagement with the merchandise. Then, as illustrated in Figure 14, the plunger 120 is raised to push the tab through the plane of the ticket while the ticket is still restrained by the head 90. The plunger 120 is then retracted, thus leaving the merchandise and the attached tag free to be removed from the machine.

It will be noted that the head 90 and its slide 92 are held down by the springs 97, but in some cases it is desirable to have the head 90 positively held during the attaching operation in order to prevent failure of attachment due to the head lifting away from the anvil as the plunger 120 rises. For this purpose the cam 96 may be shaped so as to form a cam groove 124 of sufficient extent to positively hold the head 90 against upward movement during the attaching motion of the plunger 120.

Operation

In the operation of the machine the switch 7 is turned to supply current to the motor 3 which drives the gear 16 and the ratchet 21. The merchandise to which the tag is to be attached is then placed over the anvil 9, and the clutch operating member 10 is pushed forward to release the pawl 23 and thus initiate an operating cycle of the machine. In the course of this cycle starting from the normal rest position of the parts as illustrated in Figures 1, 2, and 4, the printer head 11 is first pressed into the ink pad 12 and is then lifted again, after which the ink pad is moved out of the path of the printer head. The printer head is then depressed in a printing stroke, and as the printer head rises, the feed stroke of the feed pawl 50 begins and continues until the end ticket, which has just been printed, is pushed into the head 90, which, during the printing operation has been raised from attaching position to ticket-receiving position as illustrated in Figure 6. As the feed pawl is retracted, the printer head begins its second stroke for severing purposes, and as this stroke is completed, the end ticket is severed from the strip by the knife 82. Immediately upon completion of the severing stroke, the head 90 begins to move downwardly as the printer head returns to normal position, as the head 90 approaches attaching position, the slide 102 and finger 100 move forwardly, and shortly after the head 90 has reached attaching position, the finger 100 is rocked downwardly against the tab of the ticket to open the same. Shortly thereafter, the rear edge of the ticket is engaged by the advancing end 119 of the slide, as illustrated in Figure 10, which pushes the tag forward into engagement with the merchandise while the tab is held open. As the slide 102 approaches the end of its forward travel, the finger is released as illustrated in Figure 12 and is then retracted. Meanwhile the plunger 120 has begun to rise and continues its rise until the tab is pushed through the plane of the tag as illustrated in Figure 14, whereupon the plunger is retracted and the head 90 rises slightly in order to permit the tag and the attached merchandise to be easily withdrawn from the anvil. At the end of the cycle, the arm 28 engages the lever 30 to disengage the pawl 23 from the ratchet, thus bringing the machine to a stop.

It will be understood that the invention may be variously modified and embodied within the scope of the subjoined claims.

We claim as our invention:

1. In a machine for attaching tags having a tab therein, in combination, a platen having a printing surface, an anvil having an attaching surface, said surfaces being offset from one another, means for receiving a tag from said printing surface and carrying the same to said attaching surface, and means for advancing said tag along said attaching surface while held in the said receiving means.

2. In a machine for attaching tags having a tab therein, in combination, a platen having a printing surface, an anvil having an attaching surface, said surfaces being offset from one another, means for receiving a tag from said printing surface and carrying the same to said attaching surface, resilient means for holding said tag in said receiving means, and means for advancing said tag along said attaching surface while held in said receiving means.

3. In a machine for attaching tags having a tab therein, in combination, a platen having a printing surface, an anvil having an attaching surface, said surfaces lying in different planes and being offset from one another, means for receiving a tag from said printing surface and carrying the same to said attaching surface, and means for pushing said tab out of the plane of the tag while said tag is held in said receiving means.

4. In a machine for attaching tags having a tab therein, in combination, a platen having a printing surface, an anvil having an attaching surface, said surfaces being offset from one another, means for receiving a tag from said printing surface and carrying the same to said attaching surface, means for pushing said tab out of the plane of the tag while said tag is held in said receiving means, means for advancing said tag while held in said receiving means, and means for pushing said tab back through the plane of the tag.

5. In a machine for attaching tags having a tab therein, in combination, a platen having a printing surface, an anvil having an attaching surface, said surfaces lying in different planes and being offset from one another, means for receiving a tag from said printing surface and carrying the same to said attaching surface, means for pushing said tab out of the plane of the tag while said tag is held in said receiving means, and means for pushing said tab back through the plane of the tag.

6. In a machine for attaching tags having a tab therein, in combination, a platen having a printing surface, an anvil having an attaching surface, said surfaces being offset from one another, means for receiving a tag from said printing surface and carrying the same to said attaching surface, means for pushing said tab out of the plane of the tag while said tag is held in said receiving means, means for pushing said tab back through the plane of the tag, and means for positively holding said tag receiving means in its attaching position while said tab is pushed back through the plane of the tag.

7. In a machine for attaching tags having a tab therein, in combination, a platen having a printing surface, an anvil having an attaching surface, said surfaces lying in different planes and being offset from one another, means for receiving a tag from said printing surface and carrying the same to said attaching surface, and means for advancing said tag along said attaching surface while held in said receiving means.

8. In a machine for attaching tags having a tab therein, in combination, means providing a surface to support an edge of the merchandise to be tagged, means for pushing said tab out of the plane of the tag, means for advancing the tag along the merchandise while said tab is held out of the plane of the tag to thereby engage the edge of the merchandise between the tab and tag, and means to push said tab and merchandise through the plane of the tag to interlock the tag with the merchandise.

9. In a machine for attaching tags having a tab therein, in combination, means providing a surface to support an edge of the merchandise to be tagged, means for pushing said tab out of the plane of the tag, means for advancing the tag along the merchandise while said tab is held out of the plane of the tag to thereby engage the edge of the merchandise between the tab and tag, means to push said tab and merchandise through the plane of the tag to interlock the tag with the merchandise, and means for positively holding said tag receiving means in its attaching position while said tab is pushed back through the plane of the tag.

10. In a machine for attaching tags having a tab therein, in combination, means providing a surface to support an edge of the merchandise to be tagged, means for feeding a strip of tags one tag length at a time, means for severing the end tag from the strip, means for carrying the severed tag from the severing station into contact with the merchandise on said supporting surface, means for pushing said tab out of the plane of the tag, and means for pushing said tab back through the plane of the tag.

11. In a machine for attaching tags having a tab therein, in combination, means providing a surface to support an edge of the merchandise to be tagged, means for feeding a strip of tags one tag length at a time, means for severing the end tag from the strip, means for carrying the severed tag from the severing station into contact with the merchandise on said supporting surface, means for pushing said tab out of the plane of the tag, means for pushing said tab back through the plane of the tag, and means for positively holding said tag receiving means in its attaching position while said tab is pushed back through the plane of the tag.

12. In a machine for attaching tags having a tab therein, in combination, means providing a surface to support an edge of the merchandise to be tagged, means for feeding a strip of tags one tag length at a time, means for severing the end tag from the strip, means for carrying the severed tag from the severing station into contact with the merchandise on said supporting surface, means for pushing said tab out of the plane of the tag, means for advancing the tag along the merchandise while said tab is held out of the plane of the tag to thereby engage the edge of the merchandise between the tab and tag, and means to push said tab and merchandise through the plane of the tag to interlock the tag with the merchandise.

13. In a machine for attaching tags having a tab therein, in combination, means providing a surface to support an edge of the merchandise to be tagged, means for feeding a strip of tags one tag length at a time, means for severing the end tag from the strip, means for carrying the severed tag from the severing station into contact with the merchandise on said supporting surface, and means for advancing said tag along the merchandise while in contact therewith.

JOSEPH WEIMONT.
FRANK A. HAZARD.